United States Patent [19]

Plummer

[11] Patent Number: 4,549,891
[45] Date of Patent: Oct. 29, 1985

[54] METHOD FOR FORMING A NON-SYMMETRICAL OPTICAL FIBER

[75] Inventor: William T. Plummer, Concord, Mass.

[73] Assignee: Polaroid Corporation, Cambridge, Mass.

[21] Appl. No.: 582,914

[22] Filed: Feb. 23, 1984

[51] Int. Cl.⁴ ............................................. C03B 37/01
[52] U.S. Cl. .................... 65/3.12; 427/167; 427/264
[58] Field of Search .................. 65/3.11, 3.12, 4.21, 65/4.2, 36; 427/167, 264, 255, 255.3, 270, 292; 350/96.11, 96.12, 96.30, 96.33

[56] References Cited

U.S. PATENT DOCUMENTS

| | | | |
|---|---|---|---|
| 3,216,807 | 11/1965 | Woodcock | 65/4.21 |
| 3,659,916 | 5/1972 | Marcatili | 350/96.12 |
| 3,806,223 | 4/1974 | Keck et al. | 350/96 |
| 3,980,461 | 9/1976 | Moeckel | 65/3.12 X |
| 4,019,051 | 4/1977 | Miller | 250/227 |
| 4,089,584 | 5/1978 | Polcyznski | 350/96 |
| 4,145,457 | 3/1979 | Kersten | 427/38 |
| 4,315,666 | 2/1982 | Hicks, Jr. | 350/96.33 X |
| 4,388,800 | 6/1983 | Trezequet et al. | 65/4.2 X |
| 4,428,761 | 1/1984 | Howard et al. | 65/3.12 |

FOREIGN PATENT DOCUMENTS 57-173814  10/1982  Japan ..................... 65/4.2

Primary Examiner—Kenneth M. Schor
Attorney, Agent, or Firm—David R. Thornton

[57] ABSTRACT

A method of preparing an optical fiber includes the steps of applying a first cladding layer of a sinterable, glasseous particulate matter providing a selected index of refraction to a support surface, forming at least one longitudinally-extending groove in the layer prior to sintering, applying a deposit of glasseous particulate matter in said groove to ultimately define a core stripe having an index of refraction greater than that of the previously applied layer, applying a covering layer of glasseous particulate matter, sintering the various layers and the core strip to provide an optical fiber preform, and drawing the preform to provide an optical fiber having a rotationally non-symmetric characteristics with a core of higher index of refraction than the surrounding cladding.

11 Claims, 10 Drawing Figures

METHOD FOR FORMING A NON-SYMMETRICAL OPTICAL FIBER

BACKGROUND OF THE INVENTION

1. Field of the Invention

The present invention relates to optical fibers and, more particularly, to a method for forming optical fiber preforms and optical fibers therefrom.

2. Prior Art

Optical fibers typically include an optical energy transmitting core having a selected index of refraction surrounded by a cladding having an index of refraction lower than that of the core. When optical fibers are coupled to one another, they are ususally butt coupled or laterally coupled. With butt coupling, the ends of the fibers are usually cut transverse to the longitudinal axis of the fiber and joined in an end-to-end relationship. The alignment between the butt coupled fibers must be precisely controlled to produce the desired core-to-core registration. The alignment problem is particularly critical with single-mode fibers which can have core diamters of between 1 and 5 microns. As can be appreciated, a 1 or 2 micron lateral misalignment between butt coupled single-mode fibers can result in a substantial transimssion loss across the coupling. With lateral coupling, the fibers are placed in a side-to-side relationship with one another with energy transfer effected through evanescent field coupling between the laterally adjacent fibers. In general, the level of precision required for lateral coupling is less than that required for end-to-end butt coupling.

The techniques of lateral coupling have been greatly facilitated by the development of optical fibers, such as those disclosed in U.S. Pat. No. 4,315,666, that are rotationally non-symmetric along their length, for example, by placement of the core eccentrically in the fiber.

SUMMARY OF THE INVENTION

The present invention provides an economical method of manufacturing an optical fiber preform and fiber therefrom in which the core is assymmetrical and/or is assymmetrically aligned relative to the cladding to provide an optical fiber that is well-suited for lateral coupling. More specifically, a cylindrial glass starting blank of less than fiber optic quality is formed having a longitudinally-extending chordial or diametric flat surface, a layer of a glasseous particulate material having a selected index of refraction is applied to the flat, at least one longitudinally-extending groove is formed in the so-applied layer, a deposit of particulate glasseous matter is deposited into the so-formed groove to form a core stripe having an index of refraction greater than that of the adjacent layer, a covering layer of glasseous particulate matter is applied to the first-applied layer and the core stripe, and the various layers sintered to provide a rotationally non-symmetrical fiber preform having a rotationally non-symmetric core with an index of refraction higher than that of the surrounding cladding. The optial fiber preform can then be drawn in one or more drawing stages using a conventional drawing machine to form an optical fiber having a rotationally non-symmetric core offset within the cladding.

Advantageously, the method of the invention provides a simple, efficient arrangement for producing relatively precise rotationally non-symmetrical preforms and fibers such as D-shaped fibers. Such method is in contrast to the more involved prior methods of forming a D-shaped fiber by grinding a flat on a rotationally symmetrical preform which can lead to damage or actual breakage of the preform and variations in core to flat distance. Additionally, the method is also well suited to construction of preforms and fibers having cores and/or cladding of varied shapes.

A principal objective of the present invention is, therefore, the provision of a method for forming a rotationally non-symmetric optical fiber that is well-suited for lateral coupling. Other objects and further scope of applicability of the present invention will become apprent from the detailed description to follow, taken in conjunction with the accompanying drawings, in which like parts are designated by like reference characters.

DETAILED DESCRIPTION OF THE PREFERRED EMBODIMENT

Figure 1:
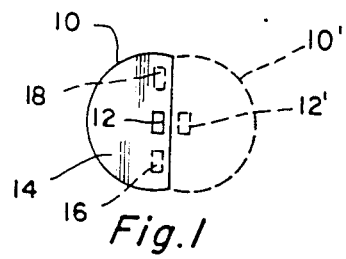
FIG. 1 is an end view of an optical fiber formed in accordance with the present invention (solid line illustration) coupled to a fiber of like construction (broken line illustration)

The method of the present invention can be used to manufacture optical fibers well suited for lateral coupling, such as the coupled optical fibers illustrated in FIG. 1 and designated generally therein by the reference character 10 (solid line illustration) and 10' (broken line illustration). As shown therein, the optical fiber 10 includes a core 12 surrounded by and positioned within a cladding 14. The cladding 14 has a generally curvilinear outer surface with a chordial flat to define an optical fiber having a "D"-shaped cross-section. The core 12, as illustrated, has a rectangular cross-section and is located in the cladding 14 adjacent to the flat surface. The optical fiber 10 can be conveniently coupled to the optical fiber 10' of like construction by laterally positioning the fibers, flat-to-flat, so that the cores 12 and 12' are sufficiently proximate to one another to effect lateral coupling, which coupling techinque is described in the aforementioned U.S. Pat. No. 4,315,666. If desired, the optical fiber 10 can be provided with additional optical energy transmitting cores 16 and 18, as shown in broken line illustration, for coupling with associated cores (not shown) in the adjacent fiber 10'.

Figure 2:
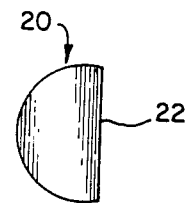
FIG. 2 is an end view of an optical fiber blank with a longitudinally-extending flat formed on one side
Figure 3:
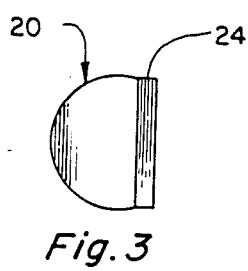
FIG. 3 is an end view of the optical fiber blank of FIG. 2 with a first cladding layer of particulate glasseous material applied to the flat surface.
Figure 4:
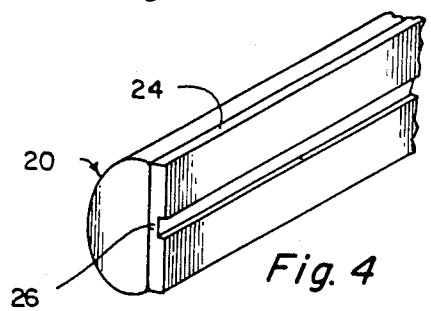
FIG. 4 is a perspective view of the blank of FIG. 3 with a longitudinally-extending groove formed in the particulate glassous layer.

The optical fibers described above can be manufactured by first preparing a starting blank 20 as shown in FIG. 2. The starting blank can be fabricated from a solid glass cylinder by machining a chordial or diametric flat surface 22 on one side. The glass material of the starting blank 20 need not be optical quality material, although it should have many of the same physical characteristics, including fiber drawing characteristics, of the to-be-applied cladding and core materials; one suitable material being fused silica ($S_iO_2$). The surface finish of the flat surface 22 should be reasonably smooth and clean to facilitate acceptance of a glasseous particulate material as described below. The flat surface 22 can be initially formed by mechanical machining and subsequently polished by mechanical polishing, fire polishing, laser polishing, or the like. Hydrofluoric acid washing of the starting blank 20 should be performed before and after all polishing operations to avoid contamination.

After fabrication of the starting blank 20, a first cladding layer 24 of a glasseous particulate material is applied to the flat surface 22 of the starting blank. This first layer 24, which will subsequently form part of the actual cladding, can be either pure or doped silica, but must have a resulting index of refraction that is less than the subsequently formed core. Where the core is to be formed from pure fused silica, the layer 24 can include a dopant, such as boron or fluorine, which is effective to provide a lowered index of refraction. Where the core is fused silica doped with a material that raises the index of refraction, the layer 24 can be undoped, pure fused silica. In the alternative, both the cladding layer and the material used to form the core can be doped in such a manner that the core has an index of refraction greater than that of the cladding.

The first layer 24 can be applied using one of several known methods, such as chemical vapor deposition (CVD), flame hydrolysis or plasma deposition, which produce a relatively soft, easily machined layer, ultimately sinterable to a hard glass of optical fiber quality. Preferably, the chemical vapor deposition (CVD) technique is used in which a vapor of silicon tetrachloride is mixed with oxygen and passed along the flat surface 22 of the starting blank 20. When heated to a temperature in the region of 1800° C., oxidation occurs to deposit a fine soot of particulate or granular silica to form an unsintered layer 24 on the flat surface 22 of the starting blank 20.

After the deposition of the layer 24, a longitudinally-extending groove 26 is formed in the unsintered and thus easily machined layer 24. The groove 26, which will form the core zone, can be formed mechanically by using a quartz or silica scribing tool. As shown in the preferred embodiment, the cross-section of the groove 26 is approximately rectangular and, accordingly, a rectangular scribing tool may be used. The groove 26 may be formed in a single pass or, if desired, by multiple passes.

Figure 5:
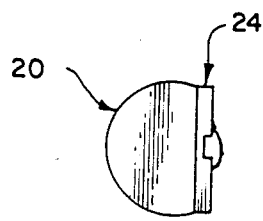
FIG. 5 is an end view of the optical fiber blank of FIG. 4 with a deposit of particulate glasseous material in the groove.

After formation of the longitudinally-extending groove 26, a glasseous particulate material is deposited into the groove to a thickness which preferably exceeds the depth of the groove, as shown in FIG. 5. The glasseous particulate material, which defines the to-be-formed core of the resulting optical fiber, can be fused silica (where the cladding layers are doped to provide a lower index of refraction) or a doped fused silica. The application of the minute soot-like particles is effected by the aforedescribed chemical vapor deposition technique, or if preferred, by flame hydrolysis. Where flame hydrolysis is used, the chlorides of silica and tetrachloride, together with oxygen, are passed through flame gasses and are hydrolyzed into a fine soot which is deposited into the groove 26. Where the cladding layer 24 is pure fused silica, the core can be formed from pure fused silica doped with a material that raises the index of refraction relative to that of the cladding. There are many suitable materials that can satisfactorily be used as a core dopant, alone or in combination with one another. These include, but are not limited to, titanium oxide, tantalum oxide, tin oxide, niobium oxide, zirconium oxide, aluminum oxide, lanthanum oxide, and germanium oxide. The amount of dopant utilized should be kept to a minimum to avoid an undo increase in the index of refraction of the subsequently formed core and to minimize a loss in the light transmission. The precise application of the soot-like glasseous material into the groove 26 can be accomplished using a small flame or flames with or without the assistance of a mask. The application of the soot-like particles can be accomplished in multiple passes and, if desired, the constituents of the material laid down in each pass can be changed to provide a core having a graded index of refraction along one dimension of the resulting core.

Figure 6:
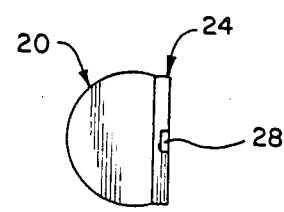
FIG. 6 is an end view of the blank of FIG. 5 with the excess groove deposit material removed to define a core stripe.

After the filling of the rectangular groove 26 with the core material, the excess core material beyond the depth of the groove 26 is removed, as shown in FIG. 6, to define a core-stripe 28 situated within the groove 26. Removal of the excess core material may be accomplished by mechanical machining and polishing.

After the groove 26 is filled and dimensionally sized to define the core-stripe 28, a second cladding layer 30 is applied over the first cladding layer 24 and the core stripe 28. The second cladding layer 30 is preferably of the same material as that of the first cladding layer 24 with the same physical and optical properties and using the same deposition techniques.

Figure 7:
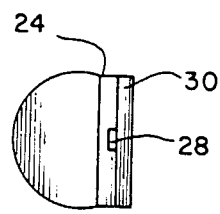
FIG. 7 is an end view of the optical fiber blank of FIG. 6 with a second cladding layer applied thereto.
Figure 8:
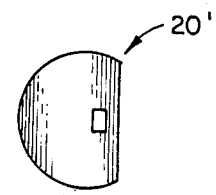
FIG. 8 is an end view of the optical fiber preform formed from the assembled blank by sintering.

Following the deposition of the layer 24, the core strip 28, and the layer 30 as described above, the starting blank 20 appears as shown in FIG. 7. Thereafter, the starting blank 20 is subject to a conventional heat treatment utilizing, for example, helium and chlorine purging to effect consolidation or sintering of the various layers into an optically transparent glass preform 20' (FIG. 8) having the desired optical characteristics. The preform 20' is then drawn in one or more stages using a drawing machine to form the desired optical fiber 10 shown in cross-section in FIG. 1.

Advantageously, the method of the invention not only allows a more economical starting blank than more conventional methods, but also permits the economical construction of forming the cladding solely along one side of the support blank, machining of the core groove in relatively soft unsintered cladding, and variation in the core cross-section and polarization orientation. Additionally, the method may be applied to provide a fiber element having a pair of cores, shown in dotted outline in FIG. 1. In this arrangement, a pair of parallel grooves are formed in the first layer, filled with core material and the preform then completed in the described manner. With regard to the described method, it should be understood that while both layers and the core stripe are preferably formed by depositing particulate material as a relatively soft, porous layer, later sintered to and compacted to a dense layer, only the first layer need be easily machinable for forming of the core groove. Moreover, while the sintering is described as applied to the composite, it should be understood that sintering may be provided after the scribing of the first layer, thereafter the machining of the core, and finally after deposit of the final layer.

For convenience and clarity of the description, rectangular cores aligned with a cladding flat are illustrated in the preferred embodiments, however, it should be understood that the core shape is optional since the core shape is dependent to a large extent upon the selected shape of the stripe formed in the first cladding layer. The subsequent consolidation and sintering steps will, however, produce some alteration from its original shape.

Figure 9:
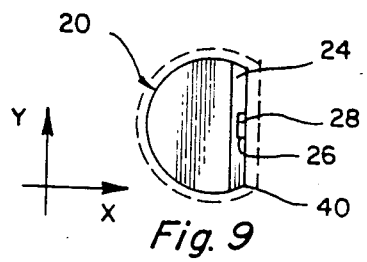
FIG. 9 is an end view of an optical fiber blank structured to specifically retain polarization characteristics.

The optical fiber 10 shown in FIG. 1 has a generally rectangular core which provides a polarization retaining property. In addition, the method described above is well-suited for manufacturing optical fibers that possess asymmetrical mechanical stress to enhance or provide a fixed polarization. For example, as shown in FIG. 9, the starting blank 20 provided with a chordial or diametric flat and the cladding layer 24 both having a relatively lower index of refraction than the subsequently formed core material is formed as described above. The coefficient of thermal expansion of the material of the cladding layer 24 is selected to be the same or very similar to that of the starting blank 20. The layer 24 is then provided with the core groove 26, which, in turn, is filled with the core material having an index of refraction higher than that of the cladding layer 24 to define the core stripe 28. After forming the core stripe 28 in the groove 26, the entire starting blank 20 is then coated with a layer of glasseous cladding material 40, as indicated in broken line illustration in FIG. 9. That portion of the coating 40 that covers the cladding layer 24 and the core stripe 28 functions as the equivalent of the second cladding layer 30 described above in relationship to FIGS. 2-8 however, the material that constitutes the coating 40 is selected or treated to provide a thermal coefficient of expansion that is lower than that of the starting blank 20 and the cladding layer 24 so that the coating material 40 is under relative compressive stress, thereby leaving the core 28 under tension along the Y-axis in the sintered and drawn product.

Figure 10:
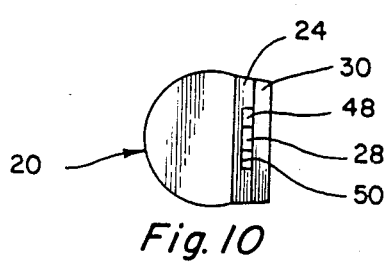
FIG. 10 is an end view of an alternate embodiment of the optical fiber invention of FIG. 9 having polarization retaining characteristics.

As shown in FIG. 10, similar results can be obtained with a starting blank 20 having first and second cladding layers 24 and 30 fabricated from materials having the same or very similar coefficient of thermal expansion with stress inducing stripes 48 and 50 located adjacent to the core 28. The stress inducing stripes are formed from materials of similar index etc. to that of the cladding layers 24, 30, but having a relatively higher coefficient of thermal expansion than these layers so as to place the core 52 under tension upon drawing of the fiber. The structure of FIG. 10 is formed in the same manner as described above in FIGS. 2-8 with, however, the cutting and filling of two grooves alongside the core 28 just following the removal of the excess core material as previously described.

The present invention provides an efficient method of producing fibers of varied core and/or cladding shapes as well as rotationally non-symmetrical fibers specifically designed for lateral coupling. Advantageously, the method is suitable for use with different fiber materials such as silica and doped silica etc. and utilizes known chemical vapor deposition or flame hydrolysis techniques along with conventional consolidation and sintering arrangements including helium and chlorine purging to remove moisture.

Thus, it will be appreciated that as a result of the present invention, an economical, highly effective process for manufacturing optical fiber preforms and optical fibers therefrom is provided by which the principal objective, among others, is completely fulfilled. It will be equally apparent and is contemplated that modifications and/or changes may be made in the disclosed process without departure from the invention. Accordingly, it is expressly intended that the foregoing description and accompanying drawings are illustrative of preferred embodiments only, not limiting, and that the true scope and spirit of the present invention will be determined by reference to the appended claims.

What is claimed is:

1. A method for forming an optical fiber preform for drawing to an optical fiber, said method comprising the steps of:
    forming an elongated support blank;
    applying a first layer of glasseous material to at least a portion of a given surface of said blank as an unsintered, soot glass layer which (1) is sinterable to a hard glass layer of given index of refraction suitable as a cladding layer and (2) is easily machineable as compared to its sintered form;
    machining a groove in said unsintered layer;
    depositing glasseous soot material within said groove and ultimately providing a core strip of hard glass material having an index of refraction higher than that of said first layer;
    applying a second layer of glasseous material over said first layer and said core stripe to provide a cladding layer of hard glass material having an index of refraction lower than that of said core stripe; and
    heating the structure at one or more stages following the step of machining said groove to sinter said first layer to a hard glass layer, to provide an optical preform.

2. The method of claim 1 wherein said forming step includes providing said given surface of said blank as a flat surface.

3. The method of claim 1 wherein at least said first glasseous layer is applied by chemical vapor deposition.

4. The method of claim 1 wherein the glasseous material deposited in the groove is applied by flame hydrolysis.

5. The method of claim 1 wherein said second layer covers the entire exterior surface of said glass blank and said first layer, and said second layer has a thermal coefficient of expansion different from that of said glass blank and said first layer.

6. The method of claim 5 wherein the thermal coefficient of expansion of said second layer is lower than that of said glass preform and said first layer.

7. The method of claim 1 including the step of forming, before said applying step, a second groove in said first layer spaced from said first mentioned groove, to form a pair of grooves therein, and said depositing step includes depositing glasseous material in both said grooves to provide a pair of core stripes.

8. The method of claim 7 wherein said grooves are substantially parallel.

9. The method of claim 1 including, when forming said groove, forming two more adjoining grooves in said first layer, depositing said material forming said core stripe in the middle one of said grooves and depositing in the others of said grooves glasseous material having a coefficient of thermal expansion higher than that of the material of said core.

10. The method of claim 1 wherein said depositing step includes depositing said glasseous material in said groove as an unsintered, glass soot stripe which is sinterable to a hard glass stripe and which is easily machinable as compared to its sintered form, said depositing step further including depositing said glasseous material to a thickness exceeding the depth of said groove, and said method further including removing the machinable material which exceeds the depth of said groove, and said heating step includes heating the structure at one or more stages following said step of removing the machinable material so as to sinter said particulate stripe to a hard glass stripe.

11. The method of claim 10 wherein said step of applying said second layer includes depositing unsintered, particulate material which is sinterable to a hard glass layer, and said heating step includes heating the structure at one or more stages following the step of applying said second layer so as to sinter said second layer to a hard glass layer.

* * * * *